JAMES D. STURGES.

Improvement in Apparatus for Cooling and Mixing Soap.

No. 4,730. Reissued Jan. 30, 1872.

Witnesses:

Henry F. Brunn.

J. M. Munday

Inventor:

James D. Sturges

UNITED STATES PATENT OFFICE.

JAMES D. STURGES, OF CHICAGO, ILLINOIS.

IMPROVEMENT IN APPARATUS FOR COOLING AND MIXING SOAP.

Specification forming part of Letters Patent No. 114,063, dated April 25, 1871; reissue No. 4,730, dated January 30, 1872.

SPECIFICATION B.

I, JAMES D. STURGES, of Chicago, in the county of Cook and State of Illinois, have invented certain Improvements in Apparatus for Cooling, Mixing, and Conveying Soap or other like substance; and do hereby declare that the following is a full, clear, and exact description thereof, to enable others skilled in the art to make and use the same, reference being had to the accompanying drawing and the letters and figures marked thereon which form part of this specification, and in which—

Figure 1:
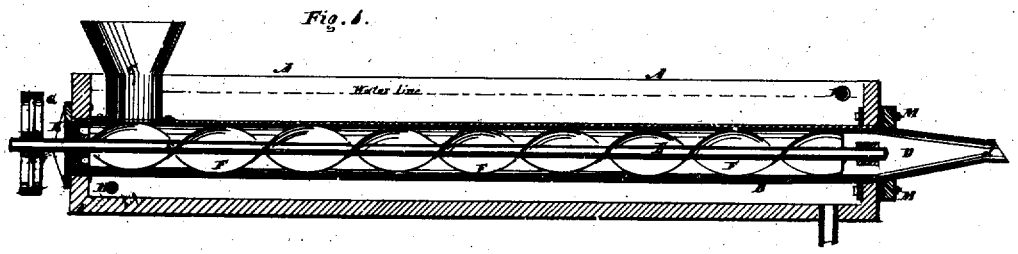
Figure 2:
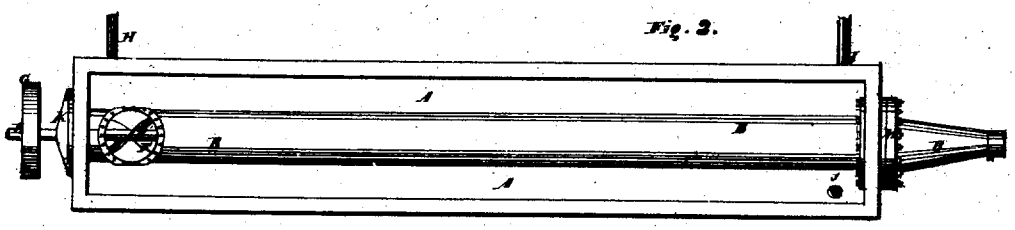
Figure 3:
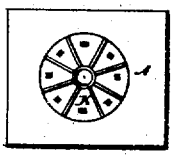
Figure 4:
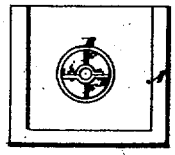
Figure 5:
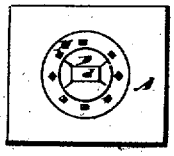

Figure 1 is a central longitudinal section of my invention. Fig. 2, a top or plan view with the hopper removed. Fig. 3, an end view, showing the head piece at left of Figs. 1 and 2. Fig. 4, an end view of the right hand with head piece removed. Fig. 5, an end view at the right hand of Figs. 1 and 2.

*General Description.*

My invention relates to a machine into which the soap may be poured, introduced, or drawn from the caldron, and which mixes or crutches the soap, and at the same time forces it through a pipe surrounded or cooled by water kept at a low temperature, which cools the soap, after which it is discharged from an aperture of a proper form and size, where appropriate machinery may be placed to shape it into bars or cakes of any desired size or length. My machine may be used for many other purposes of a like nature in other manufactures than that of soap.

Like letters of reference employed in the drawing indicate the same part in the several figures.

A is the trough or box, made water-tight and of substantial material. B is a hollow cylinder or pipe suspended in the trough or box, being supported by passing through the ends of said box. C is a pipe or funnel communicating with the tube B, and by means of which said tube may be filled with the hot soap or other substance. D is a funnel-shaped discharge, terminating in an orifice, *d*, through which the material is discharged after being cooled. E is a shaft passing through the center of the tube or cylinder B and carrying a spiral flange or flanges, F. This flange may be broken or continuous, as may be thought best for the working of such substance, as may be desired. The shaft E is rotated by power applied to the hand-wheel G, or by a crank or gearing in lieu thereof, as desired. The trough or box A is supplied with water by means of the supply-pipe H keeping up a constant supply of water, which is kept from running over by the 'scape or vent-pipe I placed near the upper line of the said trough, while a discharge-pipe, J, situated at the bottom of the trough, furnishes a means of clearing the trough entirely of water. K is a head-plate attached to the end of the trough or box and furnishing a bearing for the shaft E. L is a bearing for the other end of said shaft, being supported by braces from the tube B. M is a head-plate, which serves to secure the tube D to the box or trough A. These details of construction may, of course, be somewhat varied as to the means of securing the tube in the box and of providing a bearing for the shaft E.

The operation of my invention will be as follows: Hot soap or other material is introduced from the caldron into the pipe C, from whence it passes into the tube B, through which it is forced at any desired speed and stirred by the flanges F upon the shaft E, the said shaft being driven by any usual power. As the soap passes through the tube it is cooled by the water surrounding said tube, and by the time it reaches the further end is in the desired condition, and passes out through the discharge D, whose orifice *d* gives the proper form, and as it so passes out appropriate machinery may be adapted to form it into suitable cakes.

By my invention I save a vast amount of labor and time, while by reason of the crutching or mixing action of the spiral flanges in the tube B, I produce a better quality of soap and save the labor of crutching or mixing. By varying the pitch of the spiral flange the length of the tube and tank the velocity of the shaft or the temperature of the water, the material passing through the tube B may be discharged at different degrees of coolness or mixture. The action of the spiral flanges, by stirring and changing the contents of the tube and by bringing every part of said contents in contact with the cooling surface, materially hastens the cooling. This is not done in case the tube contains no shaft.

*Claim.*

What I claim, and desire to secure by Letters Patent, is—

The combination, with the tube B containing the spirally-flanged shaft E F, of an outside water-tank, A, substantially as specified.

JAMES D. STURGES.

Witnesses:
J. W. MUNDAY,
HEINR. F. BRUNS.